United States Patent [19]
Michael

[11] Patent Number: 4,494,140
[45] Date of Patent: Jan. 15, 1985

[54] T.V. APPARATUS FOR MOVEMENT CONTROL

[75] Inventor: Peter C. Michael, Basingstoke, England

[73] Assignee: Micro Consultants Limited, Berkshire, England

[21] Appl. No.: 340,619

[22] Filed: Jan. 19, 1982

[30] Foreign Application Priority Data

Jan. 22, 1981 [GB] United Kingdom ............... 8101916

[51] Int. Cl.³ .................. H04N 7/18; H04N 7/12; H04N 5/21
[52] U.S. Cl. .................. 358/105; 358/136; 358/167
[58] Field of Search ............ 358/108, 133, 136, 135, 358/155, 167, 177, 138

[56] References Cited

U.S. PATENT DOCUMENTS 4,214,263 7/1980 Kaiser ............................ 358/105
4,296,434 10/1981 Drewery et al. .................. 358/105
4,403,250 9/1983 Kellar ............................ 358/105

FOREIGN PATENT DOCUMENTS 2031686 4/1980 United Kingdom ............... 358/105

Primary Examiner—John C. Martin
Assistant Examiner—Edward L. Coles
Attorney, Agent, or Firm—Dowell & Dowell

[57] ABSTRACT

A video processing system for reducing data content requirements along a transmission path. A movement processor which includes a framestore is capable of detecting both interfield and interframe movement and uses this to manipulate the data so as to inhibit or attenuate the movement content so that the available bandwidth is not exceeded. This manipulation can also be used to provide residual movement persistence between frames and to reduce picture noise content. A processor at the remote end of the transmission path can reconstitute the data to make it available at normal video rates.

13 Claims, 8 Drawing Figures

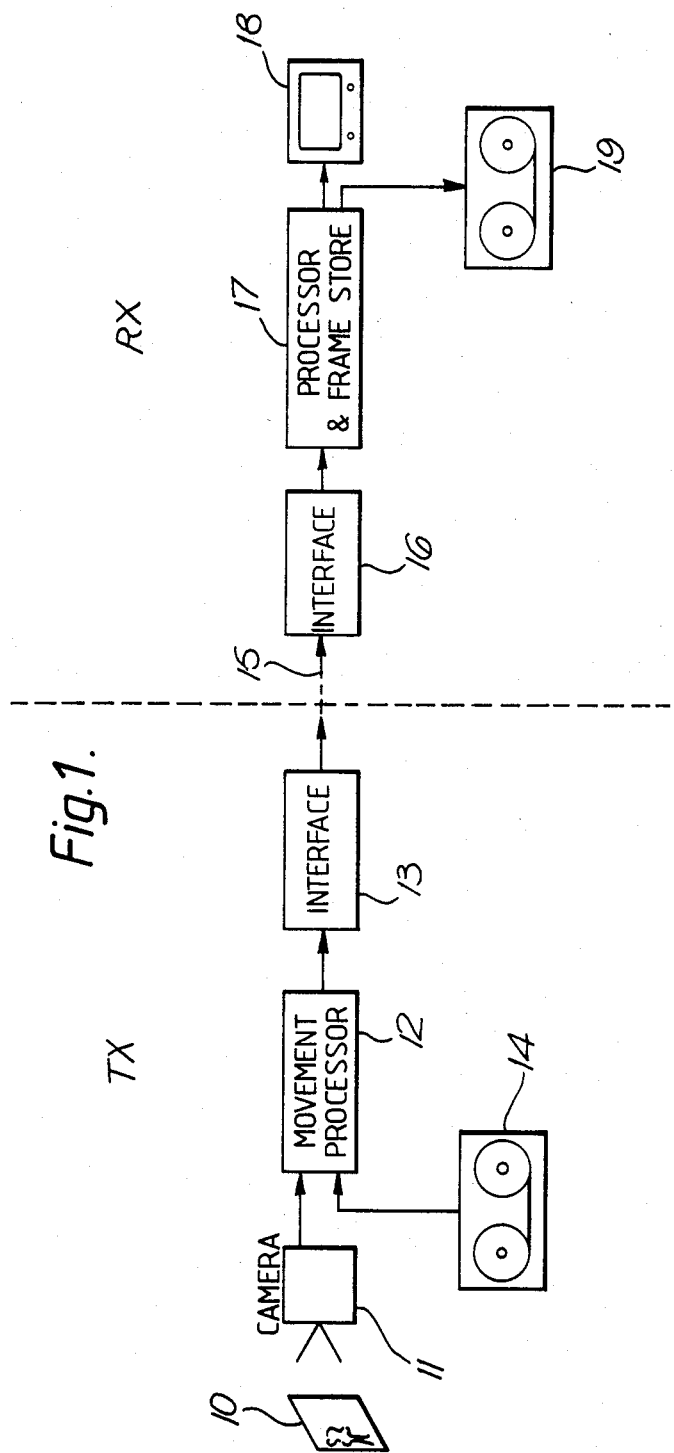

Fig.2(a).
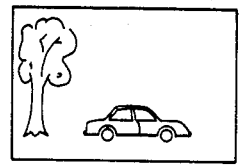 F1
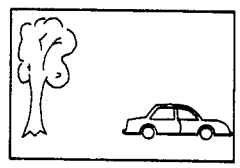 F2
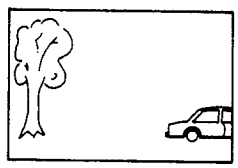 F3
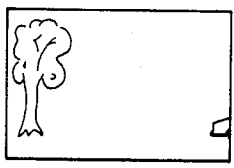 F4
BEFORE PROCESSING
Fig.2(b).
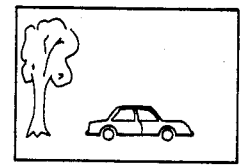 F1
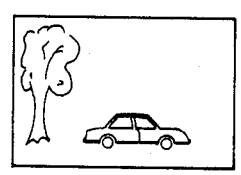 F2
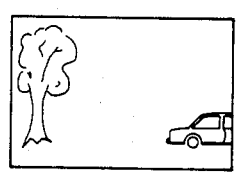 F3
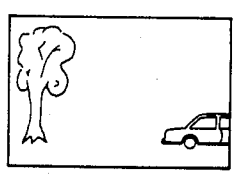 F4
AFTER PROCESSING

T.V. APPARATUS FOR MOVEMENT CONTROL

BACKGROUND TO THE INVENTION

In several applications for scanning television systems, there is need for an apparatus or method which controls the portrayal of movement.

Such a requirement exists, for example in the area of video data transmission where typically only limited bandwidth is available for the amount of data required to be transmitted from one point to another, for example via telephone land lines. To prevent overloading of the transmission medium, it is necessary to transmit data at a slower rate than it is actually being produced, so due to the length of time required to transmit the data, this precludes real time transmission of picture information which is a disadvantage especially where this has content movement.

OBJECT OF THE INVENTION

The present invention is concerned with controlling the picture information provided to facilitate data rate reduction so as to allow narrower bandwidths to be utilised. It is more particularly concerned with reducing the data rate required to transmit, typically in digital format, video signals representing pictures in which there is substantial movement or substantial noise, the reduction being made possible by selectively making signal elements substantially identical to other, otherwise different, signal elements.

SUMMARY OF THE INVENTION

Further the object of the invention is to provide a system for processing video information with a view to facilitating data rate reduction in a transmission channel, which comprises, means for receiving video signals organised in sequential scans of a picture area, means for temporarily storing signals in at least the first of a pair of said scans pending the provision of signals in the second of said pair of scans, means for outputting signals in said first scan during a first scan period, means for comparing signals in said second scan with related stored signals in said first scan, during a second scan period, means for outputting signals in said second scan during said second scan period when said comparison means indicates a relatively small difference between the compared signals and for outputting signals in the first scan when said comparison means indicates a relatively large difference between the compared signals, said means for storing, outputting and comparing being arranged to operate continuously on video signals in sequential pairs of said scans, and a transmission path for said output signals.

Further the object of the invention is to provide a method of processing video information with a view to facilitating data rate reduction in a transmission channel, which comprises the steps of receiving video signals organised in sequential scans of a picture area, temporarily storing signals in at least the first of a pair of said scans pending the provision of signals in the second of said pair of scans, outputting signals in a first scan during a first scan period, comparing signals in the second scan with the related stored signals in said first scan, outputting signals in the second scan during a second scan period when said comparison indicates a relatively small difference between the compared signals, outputting signals in the said first scan during said second scan period when said comparison indicates a relatively large difference between the compared signals, continuing said steps of storing, comparing and outputting in respect of said video signals in successive pairs of said scans, and applying said output signals to a transmission path.

According to the invention there is provided a video processing system comprising frame storage means for storing incoming picture information from first and second fields, means for determining any difference in the picture information attributable to movement, and control means for reducing the movement content made available from the frame storage means to reduce bandwidth requirements.

Feedback means are preferably included for providing at least a part of the selected information for use with at least part of the incoming information to provide a method of reducing the data portraying moving portions of the picture.

The above system may be used to reduce bandwidth requirements.

The above system may be used to reduce the amount of noise present on the video information.

Means may be provided for automatically adjusting the degree of feedback provided.

The apparatus described overcomes the disadvantages of previous methods by making use of all the information that is contained within the television frame in such a way that full vertical resolution is maintained on the stationary parts of the scene but inter-field motion is inhibited.

BRIEF DESCRIPTION OF DRAWINGS

The invention will now be described by way of example with reference to the accompanying drawings, in which:

FIG. 1 shows an arrangement for handling video information with reduced bandwidth requirements, FIGS. 2A and B show two sequences of four fields, one sequence before processing and the other after processing.

DESCRIPTION OF PREFERRED EMBODIMENT

Figure 3:
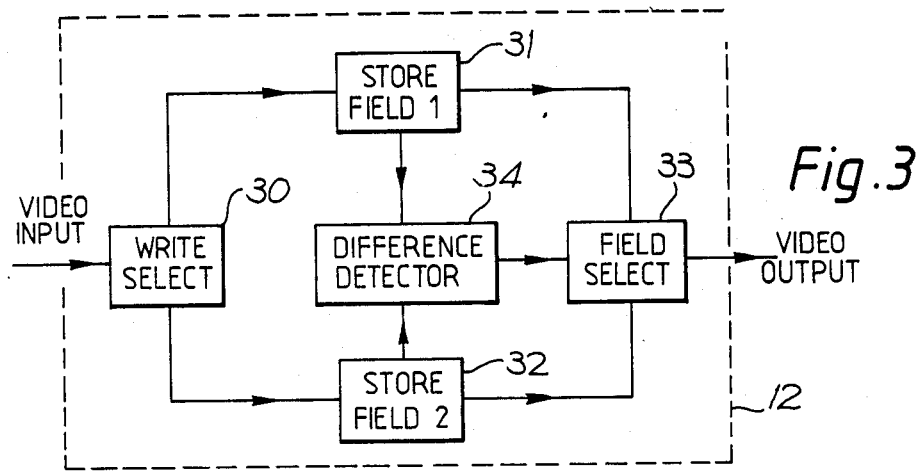
FIG. 3 shows a circuit diagram of a system for producing the second sequence shown in FIG. 2.

The system of FIG. 1 shows a configuration capable of handling video data where the transmission medium is of narrow bandwidth.

The camera 11 receives picture information (represented by scene 10) and this is passed to processor 12 where it is manipulated to reduce the data rate prior to receipt by interface 13, which acts as a buffer coupled to line 15. The data passed down the line is received by interface 16, which after further processing in processor 17 to reconstitute it into the standard format is available to be viewed on monitor 18, and/or recorded on VTR 19. Although the system is particularly useful for live images, the video information could be derived from VTR 14. If the entire picture is stationary as represented by the tree within scene 10, then the information could be passed down the line over a number of frame periods to avoid exceeding the bandwidth of line 15 which would otherwise result in an unusable picture being received. Thus the amount of data transmitted per frame period would be reduced, the entire frame being reconstituted at the other end within processor 17. Where picture movement is occurring, especially in real time, this technique alone would not be viable. Thus the processor 12 is used to manipulate the moving picture content as now described with regard to FIG. 2. A four field (2 frame) sequence is shown in FIG. 2(a).

This represents the incoming video from camera 11 (before processing), field 1 being provided first, field 2 following field 1 and interlaced with it, field 3 following field 2 and replacing field 1, whilst field 4 follows field 3 (and is interlaced with it) and replacing field 2.

This sequence of four fields shows a stationary tree and a moving car. In each of the four fields the tree is depicted and the contents of field 1 and field 3 in the area of the tree are identical. Also the contents of field 2 and field 4 in the area of the tree are identical.

The contents of the four fields are completely different in the area of the car and an image of the moving vehicle will be depicted in different places in each of the four fields as represented in FIG. 2(a).

If the processor 12 were to simply output fields 1 and 3, then the amount of data required to be transmitted would be half the full frame requirement and the processor 17 could effectively repeat fields 1 and 3 to simulate fields 2 and 4, but picture resolution would be halved. In practice, because only the portion of the picture associated with the car is changing, we can initially send information on both fields in the frame (over more than one frame period if necessary) and then update this information held in processor 17 with only those parts of the picture that are moving. In practice, the moving parts of the picture can be updated at frame rate rather than field rate, as represented in FIG. 2(b) which would be available from movement processor 12. This is because the human eye is less critical of moving parts of the picture. Thus fields 1 and 2 can be provided from output processor 17 at full resolution during those portions of the frame that are stationary and the moving portion of the frame provided by merely repeating field 1 in that picture area (which can be achieved by processor 17). This allows only movement portions to be sent at an update rate of frame rate rather than field rate, and this can be further enhanced as described later to make the moving portions less liable to degradation.

Thus the processing system in this embodiment of the invention produces a new set of four fields depicted by FIG. 2(b). The contents of the four fields remain unaltered in the area of the tree. However, field 2 and field 4 have been modified in the area of the car relative to original fields 2 and 4.

Field 2 has effectively used the information of the car contained in field 1 and reproduced a synthetic image of the car in field 2.

Field 4 has effectively used the information concerning the car contained in field 3 and produced a synthetic image of the car in field 4.

The position of the car does not change between field 1 and field 2, neither does it change between field 3 and field 4. In effect, the system produces motion at a frame rate, which is half field rate and in a television system operating at 50 fields per second the movement portrayal will now be shown at intervals of 1/25th of a second at the ouput of the processing system rather than at 1/50th of a second at the input of the processing system.

One embodiment of the movement processor 12 of FIG. 1 is shown in FIG. 3.

Where the video input is in analogue form it will typically be digitized by standard techinques before being applied to write control selector 30 which effectively switches field 1 in to the first field store 31 dedicated to the odd fields, whereas field 2 is stored in the second store 32 dedicated to the even fields. The stores can be fabricated from RAM chips and addressed using standard line and picture point counters synchronised to the incoming video using well known video techniques. Incoming information will thus be steadily written as odd and even fields into the respective parts of the digital store. Such a store is shown diagrammatically as two separate stores 31 and 32 but may be fabricated as a single contiguous store with suitable write control circuits.

The output from the odd and even store units are applied to a field select mechanism 33, which determines whether the data will come from the odd or the even store. The field select unit in its simplest form takes data from either one store or the other store and may be considered a switch.

The position of the field select switch is determined by a difference detector 34. The purpose of the difference detector is to examine the contents of the odd and even store units and detect whether a major change has taken place which can be ascribed to movement. If no movement is detected between the odd and even store units, the field select switch 33 will operate alternately from field to field in exactly the same way as the input write control circuits operate. Data will first be read from field 1 store and then from field 2 store. The sequence will continue without interruption corresponding to the write situation if no interfield movement has occurred.

The function of the difference detector is to operate within the field period and detect differences that exist which may be ascribed to movement. When such a difference exists, the field select unit 33 arranges to take data from field store 1 and ignore information from field store 2.

Thus, in the examples shown, suppose that the sequence of reading from the stores starts at field 1, top left hand corner. The field select unit will switch to read store 1 and continue to do so depicting first the tree and then the motor car until it reaches the bottom right hand corner.

The field select unit then switches automatically to field store 2. The process of reading the contents of field store 2 will start at the left hand top corner and will progress, depicting first the tree until the difference unit recognises that there is a significant difference between the position of the car in field 1 and field 2. At that point, the difference detector 34 will signal the field select unit 33 to take information from field store 1 until the car has been synthetically produced in the output of field 2. At that point, the field select will switch to reading the contents of field 2 and continue to the bottom right hand corner.

The field select unit will then switch to read the contents of field store 1, starting again at the top left hand corner, and reading the contents, which will in the meantime have changed to the image shown as field 3. The field select unit will continue to read the contents of field 3 from top left to bottom right and will then switch to read the contents of field store unit 2. The contents of field store unit 2 will have in the meantime been updated to contain the image shown as field 4. The field select unit will commence reading from top left and continue to depict the tree. The difference unit will detect a significant change has occurred between field 3 and field 4 concerning the movement of the car. At that point, the field select unit will switch to extract the information concerning the car from field 3 and produce a synthetic image in field 4. The sequence continues as described above.

The difference detector 34 can comprise a digital comparator for comparing one or more pixels from each field to detect interfield differences above a given threshold.

The basic processor shown in FIG. 3 may be considerably improved for example by using interpolation processes to determine the generation of the synthetic image. Such interpolation processes are known in the video art and thus not described further. One such process could be used to take the information from two or more lines in field 1 in order to construct the required synthetic image to place in field 2 for that picture portion.

Figure 4:
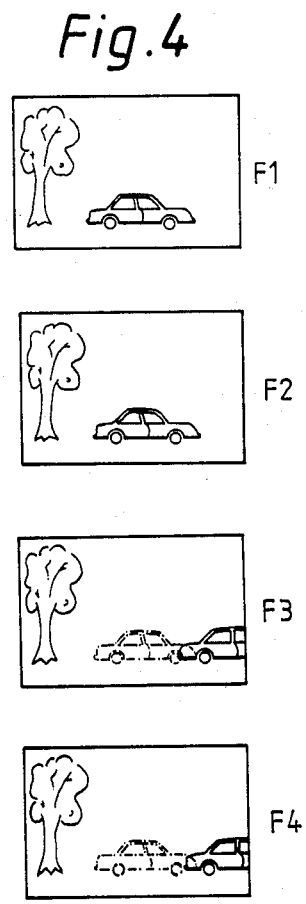
FIG. 4 shows a further sequence of four fields in which the third and fourth fields show a small residual image, of the moving portion of the picture obtained from the first and second fields.

The apparatus described with reference to FIGS. 1 and 3 produces movement portrayal at the output which has larger steps between each moving image as shown in FIG. 2(b). Such movement portrayal is generally satisfactory but could be improved. We have found that if a residual image of the moving portion is retained for a further frame period this 'fools' the eye to see smoother movement changes. Such a process adds further information into the output image from previous field data. The improvement is shown diagrammatically in FIG. 4. No change has taken place in the output of the apparatus fields 1 and 2.

Fields 3 and 4, however, contain a small residual image of the moving car, which was previously shown in fields 1 and 2 respectively. Although no movement is taking place between fields 3 and 4, an illusion is created to the eye of a more continuous and less jerky movement portrayal.

Figure 5:
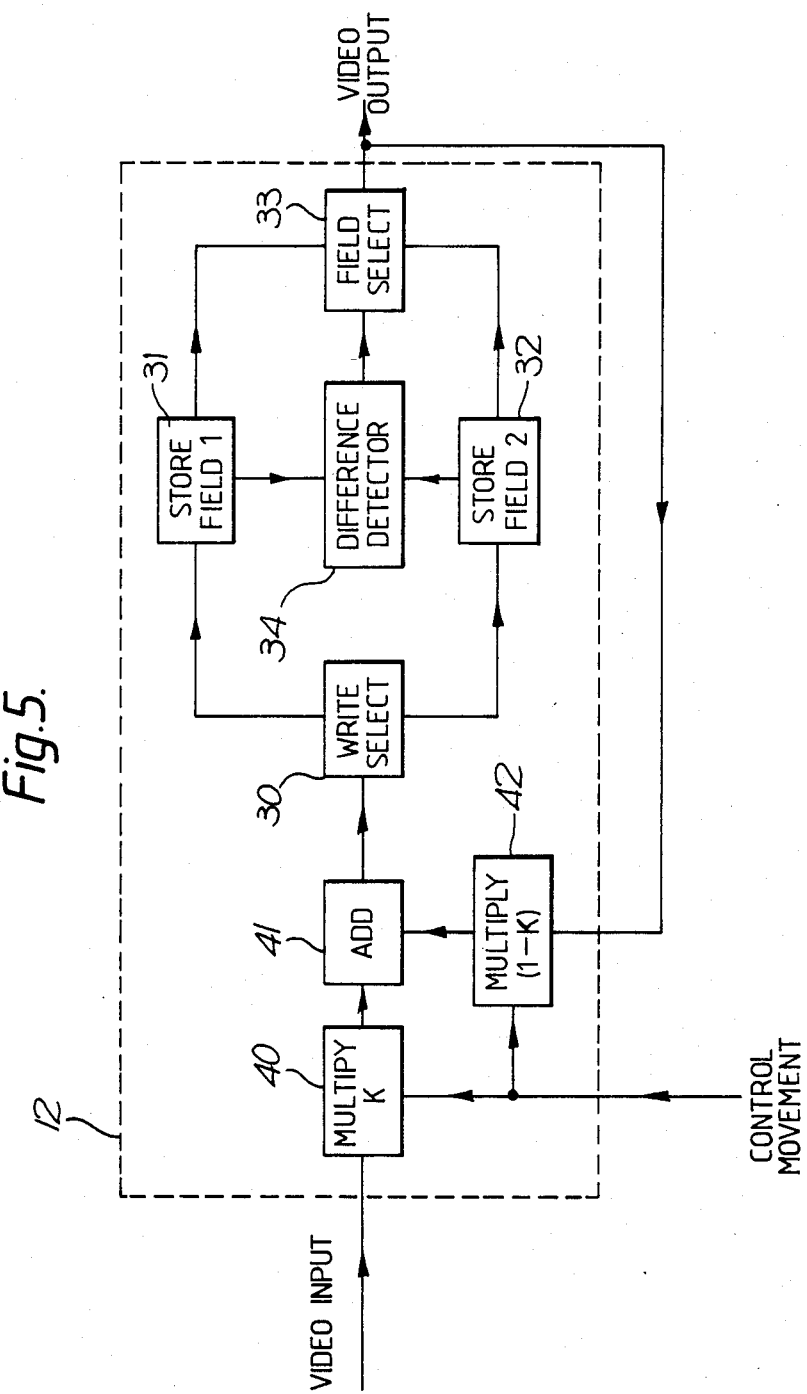
FIG. 5 shows a circuit diagram of a system for producing the sequence shown in FIG. 4.

The movement processor 12 of FIG. 3 can be replaced by the embodiment of FIG. 5 to provide this improvement.

The apparatus shown in FIG. 3 is contained within the improved circuit in FIG. 5 and, in addition, a feedback path is provided so that part of the stored data may be added to part of the new incoming video data. The process occurs digitally and the multiplier units 40, 42 and the adder unit 41 are operating in a digital domain and would comprise digital multipliers, or adders respectively.

The input video information is first multiplied (within multiplier 40) by a factor K, which is less than 1. The reduced incoming video is then added within adder 41 to the previously stored output video which has meanwhile been multiplied by a factor of 1 minus K within multiplier 42. The value of K may be adjusted to suit the observer and the value between one quarter and three quarters has been found appropriate. The value of K may be adjusted to suit the available bandwidth in the transmission path. When K is close to 1.0 new data entering the system is passed directly to the store and full portrayal of movement is possible provided that the transmission path can accept the data rate presented.

When K is close to 0 virtually no new data is allowed into the store and the picture updates very slowly. The transmission bandwidth required is consequently low and movement portrayal limited.

In practice the value K is adjusted so that the mean rate of the data transmission just matches the new data required by the store modified by K to the available data transmission path. Such adjustment may take place manually or more usefully automatically dependent upon the contents of the buffer store within the interface to the transmission system.

When the buffer store is empty K is increased towards 1.0. As the buffer store fills K is reduced progressively. If the buffer reaches its full capacity K is reduced to zero.

The additional parts of the system described in FIG. 5 acts as a recursive filter in the time domain and in itself does not affect the horizontal or vertical resolution of the television system. In effect, it may be considered as a filter to reduce movement within a television signal. Thus this processor can be of benefit in the FIG. 1 system for example which is aimed at reducing the data rate needed for transmission or recording purposes. In a transmission system, which uses bit rate reduction techniques from field to field, the amount of movement contained within the television image becomes particularly significant.

The processor described in FIG. 5 can filter the movement contents so that only a reduced or narrow bandwidth is needed in the transmission system which may be all that is available. By adjusting the value of K, it is possible to reduce the amount of movement portrayed at the output of the system. In such a transmission system, it becomes possible to adjust the value of K from the knowledge of the overload characteristics taking place in the bandwidth compression system.

A further advantage from the use of this system may be obtained as regards noise levels on the video signals. Techniques which use interfield or interframe coding methods to reduce television bandwidth requirements are generally easily overloaded if high noise signals are present at the input. Although the scene being transmitted may be totally static, in the presence of noise it may appear to the bandwidth compression system that continuous movement is taking place. The effect of the noise may be to demand more bandwidth than is available from the system and cause an overload. The perceived result may take a variety of forms, none of which is desirable.

Thus by utilising the FIG. 5 arrangement and selecting a suitable value of K for movement control this can also be effective in reducing the amount of noise present on the signal prior to bandwidth compression.

Figure 6:
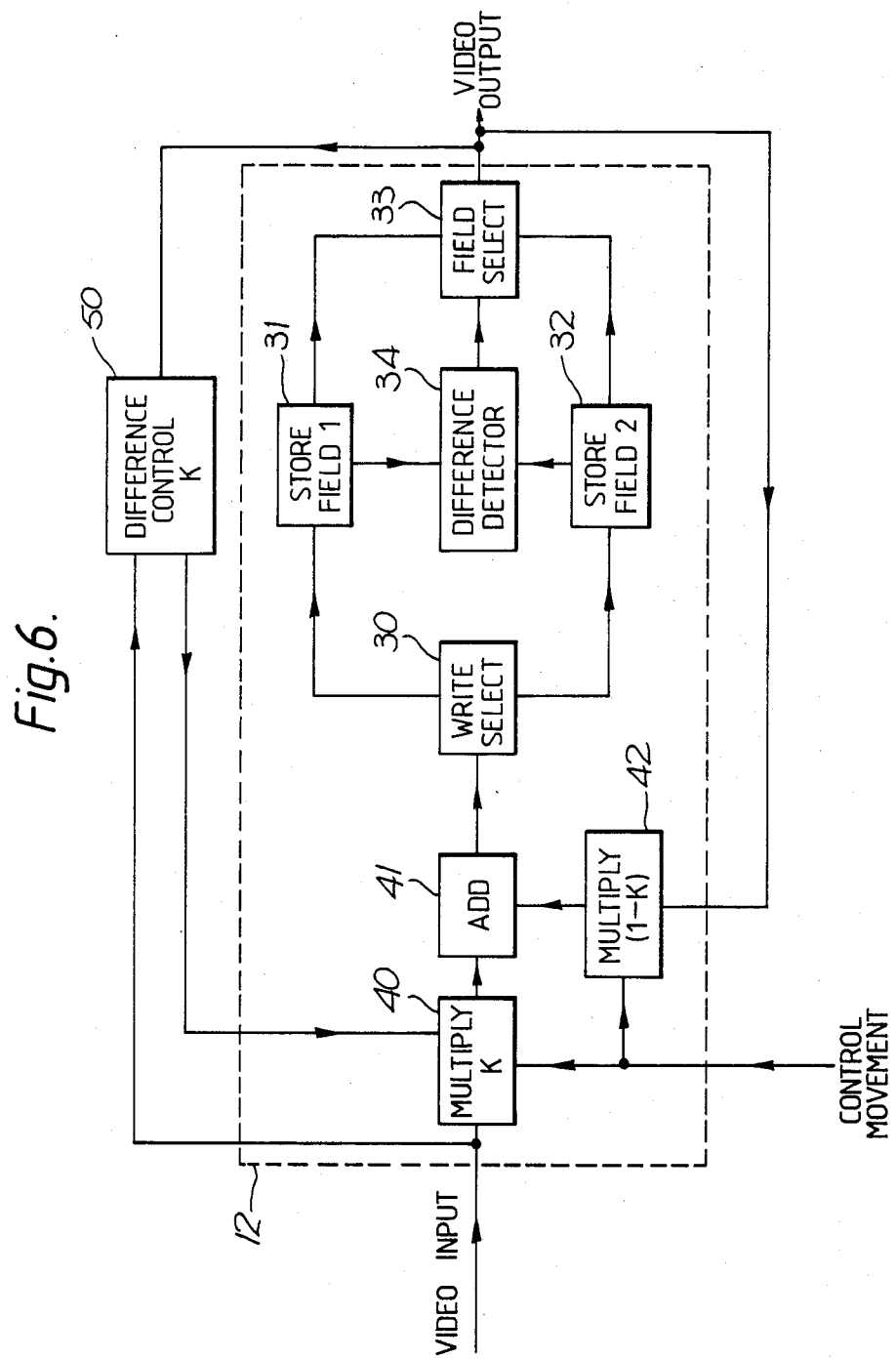
FIG. 6 shows a modification of the circuit shown in FIG. 5, including a difference control circuit for adjusting the value of the factor (K) by which the video input signal is multiplied.

FIG. 6 shows a modification to FIG. 5 which allows automatic adjustment to the value of K to be effected. The use of the movement control system as a recursive filter in the time domain allows the bandwidth to be reduced, so that noise is attenuated as now explained.

The difference control unit 50 examines the difference between the input signal and the output signal to determine whether any major changes have taken place during the period of one frame. Supposing that no major difference is detected between frames, it is a general indication that the part of the scene under examination is static. under such conditions the value of K may be significantly reduced and the filter function in time increased so that noise is significantly attenuated. Provided that the scene remains static, the noise filtering operation may be allowed to proceed.

The function of the difference unit 50 is to detect that a major change has taken place, which may be ascribed to interframe movement. An alternate description of the function of the difference unit may be to consider it as a movement detector. During portions of the picture which show a significant change between frames, the value of K may be reduced so that movement is more accurately portrayed in the output signal. The value of K between adequate movement portrayal and useful noise filtering is a compromise and no single value has been found totally effective for all applications. To aid flexibility the difference control 50 can incorporate adaptive detection techniques so as to automatically determine the contents of various scenes, so that the best compromise for the value of K can be achieved automatically.

Thus the user has the option of manually setting the value of K and/or using the control 50 to adjust the value under varying picture conditions as illustrated by the FIG. 6 arrangement.

The basic apparatus described thus removes movement between fields and thus halves the amount of movement that has to be transmitted. The further filter function which operates as a movement "valve" may further be adjusted to control the movement within a scene, so that it does not overload the bandwidth of the transmission system.

A third reduction of the data within the system takes place if the noise reduction feature is utilised. So far as the transmission system is concerned, noise cannot be easily differentiated from movement and it is the purpose of this system to reduce noise within the scene, so that less data is applied to the transmission system.

Figure 7:
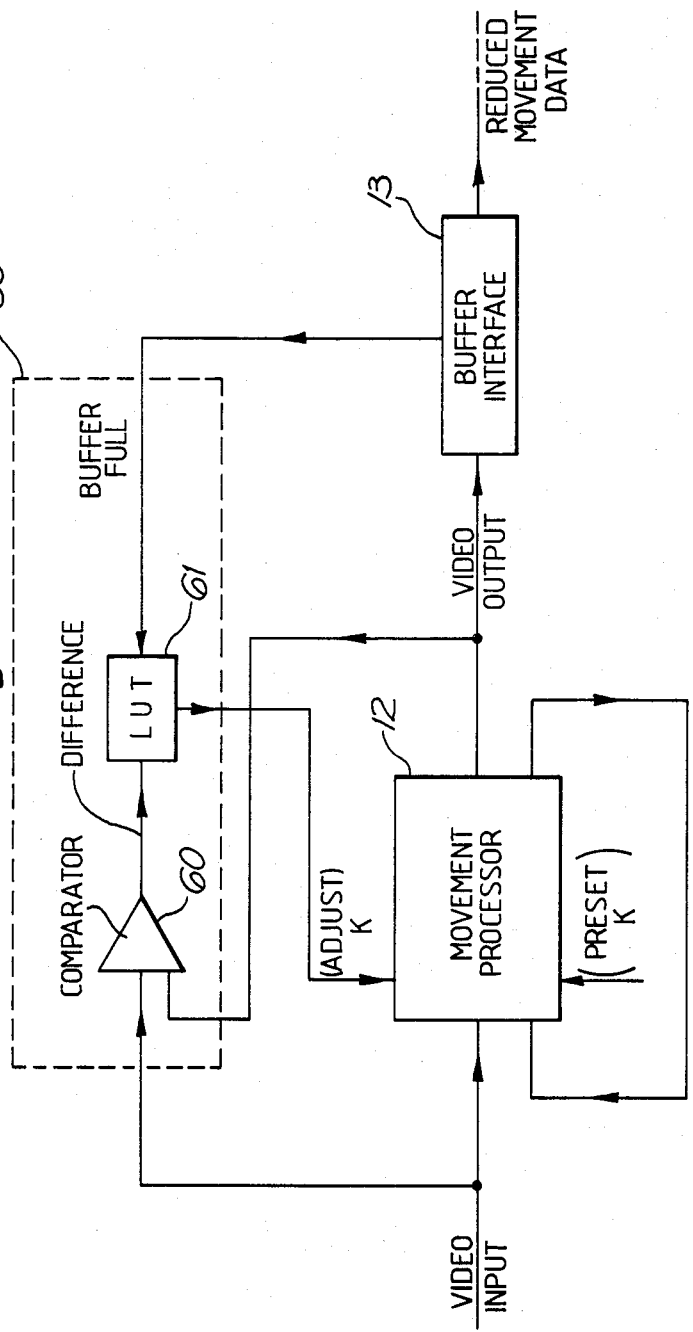
FIG. 7 shows the difference control in more detail.

The way in which the difference control 50 operates is explained in more detail with reference to FIG. 7.

The control 50 includes a comparator 60 and look up table 61. The comparator 60 detects movement between incoming and stored frame data and dependent on this difference produces an output for accessing the LUT 61, so as to vary the value of K accordingly. The LUT 61 can also have an input from buffer 13 so that when this buffer is unable to handle any further data the output signal indicating that the buffer is full is passed to LUT 61 and K is reduced to prevent the available bandwidth being exceeded.

Alternatively, the control output from buffer 13 can be variable as the buffer content varies so that the output to LUT 61 can be used to gradually reduce the value of K for example as the buffer becomes more and more full with data so that progressive reduction of K is achieved in this way.

I claim:

1. A video processing system comprising frame storage means for storing incoming picture information from first and second fields, means for determining any difference in the picture information attributable to movement, control means for reducing the movement content made available from the frame storage means to reduce bandwidth requirements, and feedback means for providing at least a part of the previously stored information for use with at least part of the incoming information to provide residual persistence for moving portions of the picture, said feedback means including an arithmetic processor for manipulating the stored and incoming information in selected proportions determined by the control means.

2. A system according to claim 1, wherein the arithmetic processor includes at least one digital multiplier and adder for attenuating movement and noise present in the video information.

3. A system according to claim 1, wherein the difference determining means includes a detector adapted to detect movement between current and previously provided video frames to provide a variable output for use by the control means.

4. A system according to claim 1, wherein the control means is adapted to provide a control signal for use by the arithmetic processor in dependence on the detected interframe difference to automatically attenuate interframe motion so as to be below bandwidth requirements.

5. A system according to claim 1, wherein the difference determining means is adapted to detect both interfield and interframe movement and the control means is capable of modifying the movement content both between fields and between frames to allow both interfield and interframe movement content to be reduced.

6. In a video transmission system according to claim 1, including a data buffer provided to allow interfacing of the reduced movement output of said storage means to a transmission medium which is of reduced bandwidth relative to the incoming picture information.

7. A system for processing video information with a view to facilitating data rate reduction in a transmission channel, which comprises, means for receiving video signals organised in sequential pairs of fields, means for temporarily storing signals in at least the first of a pair of said fields pending the provision of signals in the second of said pair of fields, means for outputting signals in said first field during a first field period, means for comparing signals in said second field with related stored signals in said first field, during a second field period, means for outputting signals in said second field during said second field period when said comparison means indicates a relatively small difference between the compared signals and for outputting signals in the first field when said comparison means indicates a relatively large difference between the compared signals, said means for storing, outputting and comparing being arranged to operate continuously on video signals in sequential pairs of said fields, and a transmission path for said output signals.

8. A system according to claim 7, further comprising means for combining a proportion of the output signal during a frame period with a complementary proportion of input video signals to provide said video signals applied to said storage and comparing means, thereby to reduce the effect of interframe motion or noise on said output signals.

9. A system according to claim 8, further comprising means for comparing said output signal with said input signals over a frame period, and means for controlling said complementary proportions so as to increase the proportion of said input signal when a relatively large difference is detected between said output and input signals, and to reduce the proportion of said input signal when a relatively small difference is detected between said input and output signals.

10. A method of processing video information with a view to facilitating data rate reduction in a transmission channel, which comprises the steps of receiving video signals organised in sequential pairs of fields, temporarily storing signals in at least the first of a pair of said fields pending the provision of signals in the second of said pair of fields, outputting signals in a first field during a first field period, comparing signals in the second field with the related stored signals in said first field, outputting signals in the second field during a second field period when said comparison indicates a relatively small difference between the compared signals, outputting signals in the said first field during said second field period when said comparison indicates a relatively large difference between the compared signals, continuing said steps of storing, comparing and outputting in respect of said video signals in successive pairs of said fields, and applying said output signals to a transmission path.

11. A method according to claim 10, further comprising the steps of combining a proportion of the output signal during a frame period with a complementary proportion of the input video signals to provide said video signals which are stored and compared, comparing said output signal with said input signal over a frame period, increasing the proportion of said input signal where a relatively large difference is detected between said output and said input signal, and reducing the proportion of said input signal when a relatively small difference is detected between said output and said input signal.

12. A system for processing video information with a view to facilitating data rate reduction in a transmission channel, which comprises, means for receiving video signals organised in sequential scans of a picture area, means for temporarily storing signals in at least the first of a pair of said scans pending the provision of signals in the second of said pair of scans, means for outputting signals in said first scan during a first scan period, means for comparing signals in said second scan with related stored signals in said first scan, during a second scan period, means for outputting signals in said second scan during said second scan period when said comparison means indicates a relatively small difference between the compared signals and for outputting signals in the first scan when said comparison means indicates a relatively large difference between the compared signals, said means for storing, outputting and comparing being arranged to operate continuously on video signals in sequential pairs of said scans, and a transmission path for said output signals.

13. A method of processing video information with a view to facilitating data rate reduction in a transmission channel, which comprises the steps of receiving video signals organised in sequential scans of a picture area, temporarily storing signals in at least the first of a pair of said scans pending the provision of signals in the second of said pair of scans, outputting signals in a first scan during a first scan period, comparing signals in the second scan with the related stored signals in said first scan, outputting signals in the second scan during a second scan period when said comparison indicates a relatively small difference between the compared signals, outputting signals in the said first scan during said second scan period when said comparison indicates a relatively large difference between the compared signals, continuing said steps of storing, comparing and outputting in respect of said video signals in successive pair of said scans, and applying said output signals to a transmission path.

* * * * *